United States Patent
Benjey et al.

(10) Patent No.: US 6,484,741 B2
(45) Date of Patent: Nov. 26, 2002

(54) FUEL TANK VAPOR VENT VALVE ASSEMBLY AND METHOD OF MAKING SAME

(75) Inventors: Robert P. Benjey, Dexter, MI (US); Gill E. Eisenstein, Lake Zurich, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/794,428

(22) Filed: Feb. 26, 2001

(65) Prior Publication Data

US 2002/0117206 A1 Aug. 29, 2002

(51) Int. Cl.[7] .............................................. F16K 24/04
(52) U.S. Cl. ..................... 137/15.26; 137/202; 137/587
(58) Field of Search ................................ 137/15.26, 43, 137/202, 587

(56) References Cited

U.S. PATENT DOCUMENTS 5,139,043 A * 8/1992 Hyde et al. .................... 137/43
5,404,907 A * 4/1995 Benjey et al. .......... 137/202 X

* cited by examiner

Primary Examiner—Gerald A. Michalsky
(74) Attorney, Agent, or Firm—Roger A. Johnston

(57) ABSTRACT

A fuel vapor vent valve and method of making same for installation in an access opening of non-metallic fuel tanks. The valve body is formed of material not weldable to the tanks and an annular seal member formed of resilient material seals between the body upper portion exterior to the access opening and an overmold formed of material weldable to the tanks for retaining and sealing the valve thereon. In one embodiment the seal member is received in a groove and retained by a ring; and, in another embodiment the seal is formed by potting material cured in the groove prior to the overmolding.

16 Claims, 2 Drawing Sheets

FUEL TANK VAPOR VENT VALVE ASSEMBLY AND METHOD OF MAKING SAME

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to float operated valves for controlling venting of vapor from a motor vehicle fuel tank. Such fuel tank vapor vent valves, in a typical passenger car or light truck application, have the valve outlet connected to a storage canister which is connected to the engine air inlet to purge the canister of vapors upon operation the vehicle engine.

Vapor vent valves of the aforesaid type are designed to be installed through an access opening in the upper wall or top of the fuel tank and control vapor flow through the valve outlet, which extends exteriorly of the fuel tank. Such valves are commonly float operated; and, the float is operative to close the valve outlet when the liquid fuel level in the tank is raised to the top of the tank upon refueling.

Present practice in the passenger car light truck motor vehicle manufacturing includes forming fuel tanks of a molded plastic material impervious to the fuel liquid and vapor as for example: high density polyethylene (HDPE) material.

In order to minimize fuel or vapor leakage around the valve access opening in tanks formed of HDPE, it has been desired to retain and seal the valve in the tank access opening by permanent means such as, for example, ultrasonic weldment.

However, it has been found necessary to form the valve body from structural material, which is dimensionally stable in the presence of liquid and vaporized fuel and atmospheric moisture and thus is different from the tanks material. In particular, materials found suitable for fabricating the valve body and float have been found to be non-weldable to the HDPE material of the fuel tank. Thus, it has been desired to provide an attachment for the valve body which is weldable to the fuel tank and which provides adequate sealing to prevent escape of the fuel vapors through the attachment.

Heretofore, it has been known to provide an attachment member formed of material suitable for weldment a tank formed of to HDPE material and to seal the attachment installation upon the valve body by sealing surfaces configured to provide a tortuous path of engagement between the attachment and valve body.

However, this own technique for providing a seal between the weldable attachment member for the tank and the valve body in a fuel tank vapor vent valve has been found to cause problems in service in view of the dimensional variations between the attachment and valve body as fabricated; and, expansion and contraction due to ambient temperature changes has attributed to leakage between the attachment and valve body.

Therefore, it has been desired to provide a simple, reliable and robust technique for mounting and sealing a fuel vapor vent valve on a vehicle fuel tank in a manner which prevents fuel vapors escaping to the atmosphere surrounding the tank and yet provides for weldment to the tank and is sufficiently economical to be practical for high volume mass production motor vehicles.

BRIEF SUMMARY OF THE INVENTION

The present invention provides a technique for attaching and sealing a fuel vapor vent valve to a vehicle fuel tank in a manner which addresses the above-described problem vapor leakage between the attachment formed of material weldable to the fuel tank and the valve body formed of material which is not welable to the fuel tank. The valve and method of making same of the present invention employ a groove formed in the mounting flange of the valve body with a low permeation resilient seal disposed in the groove. The peripheral portion of the flange, the groove and the resilient seal are then overmolded with plastic material which is weldable to the fuel tank material. In one embodiment the annular resilient seal is formed of cured elastomer attached to a rigid ring; and, in another embodiment the resilient annular seal is formed of potting compound dispensed in the groove and cured therein prior to overmolding with material weldable to the tank.

In the presently preferred practice the over mold is formed of high density polyethylene material (HDPE); and, the valve body is formed of material selected from the group consisting of aliphatic polyketone, polythalamine, polyamide, acetal, polyester, polyphenylene sulphide and glass filled polyamide.

DETAILED DESCRIPTION OF THE INVENTION

Figure 1:
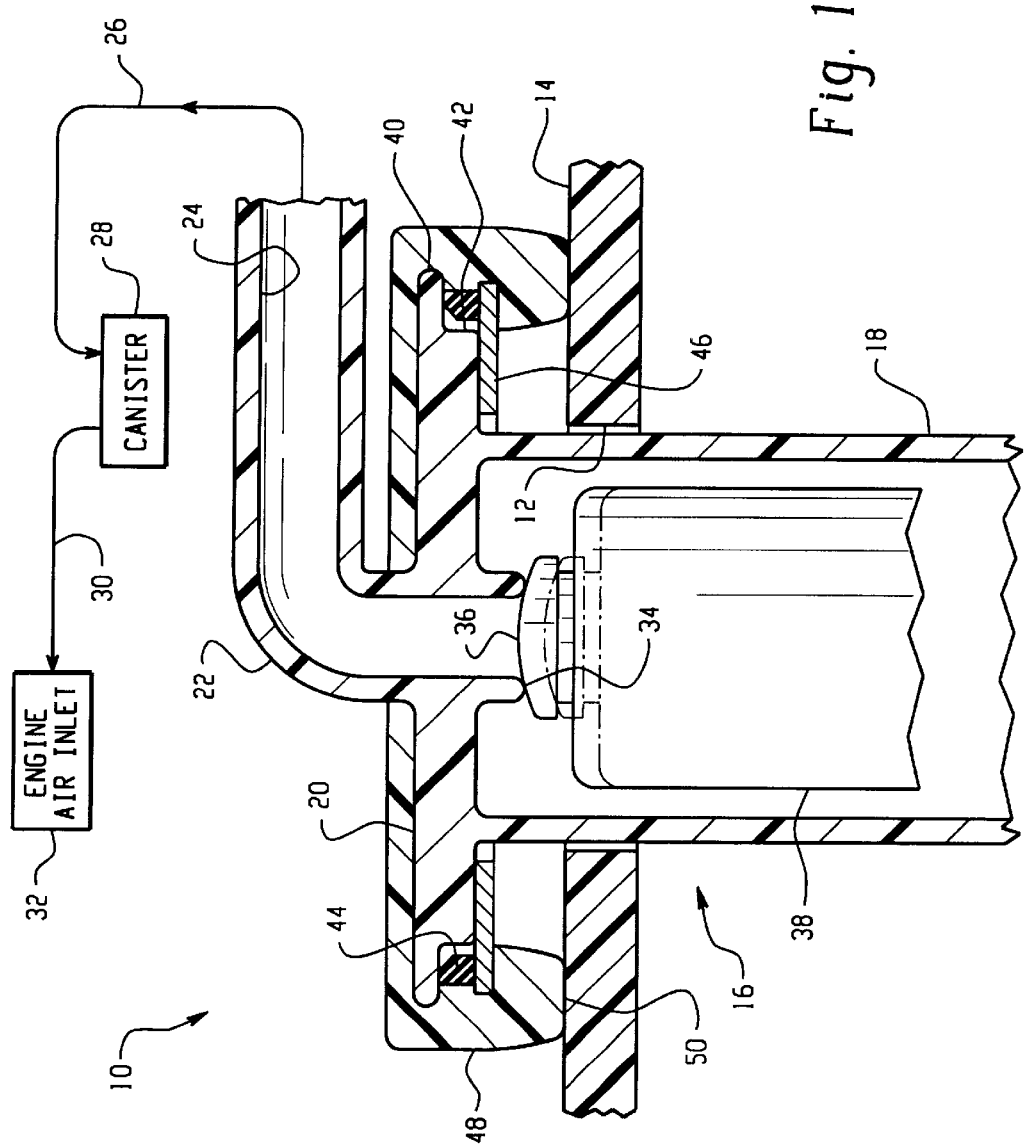
FIG. 1 is a cross section of a portion of the valve of the present invention as installed in the top of a fuel tank and connected to a vapor storage/purge system.

Referring to FIG. 1, the valve assembly is indicated generally at 10 and is shown installed through an access opening 12 formed in the top wall 14 of a fuel tank. The valve 10 includes a valve body indicated generally at 16 having a hollowed lower portion 18 extending through the opening 12 and into the interior of the tank and an upper portion 20 which is disposed exteriorly of the tank and extends radially over the opening 12. The upper portion 20 includes a fitting or nipple 22 which has a vapor vent passage 24 formed therein which is adapted for connection through a conduit 26 to a storage canister 28 which connects through conduit 30 to the air inlet of an engine 32.

The passage 24 communicates with the interior of the lower portion 18 by means of a valve seat 34. The valve seat 34 is contacted by a valve member or obtuator 36 formed on the upper end of a float 38 disposed within the hollowed lower portion 18 for vertical movement therein in response to rising levels of liquid fuel (not shown) within the tank. In FIG. 1 the valve 36 is shown in solid outline in the closed position against valve seat 34 when the float is in the position reflecting a completely filled fuel tank; and, the open position of the valve member 36 and float 38 is shown in dashed outline in FIG. 1.

It will be understood that the float may be spring biased with an uniform spring upward; and, as known in the art, the spring bias calibrated to provide the proper buoyancy of the float to effect valve closing at the desired fuel level in the tank.

The upper portion 20 of the valve body has an annular flange 40 extending radially outward from the access opening 12 over the exterior or upper surface of the tank wall 14. Flange 40 has an annular recess or groove 42 formed therein which has received therein a resilient seal as denoted by reference numeral 44. In the embodiment of FIG. 1 seal 44 is a cured elastomer attached to a rigid support member 46 having an annular configuration and registered against the under surface of flange 40. In the present practice of the invention the elastomer seal ring 44 may either be cured onto the ring 46 or attached thereto by suitable sealing expedient, as for example, an adhesive. It will be understood that the seal 44 extends laterally, or vertically with respect to FIG. 1, by an amount sufficient to be compressed between the side of recess or groove 42 and the annular member 46 when the member 46 is registered against the upper portion of the body.

The annular member 46, and annular seal 44, in addition to the upper surface of flange 40 is then overmolded with a material suitable for weldment to the tank wall 14, which in the presently preferred practice of the invention comprises high density polyethylene (HDPE) material for use with fuel tanks formed of the same material. The over mold denoted by reference numeral 48 forms an annular flange extending axially downward as denoted by reference numeral 50 which flange is adapted for weldment to the upper surface of tank well 14 as, for example, by hotplate weldment.

Figure 2:
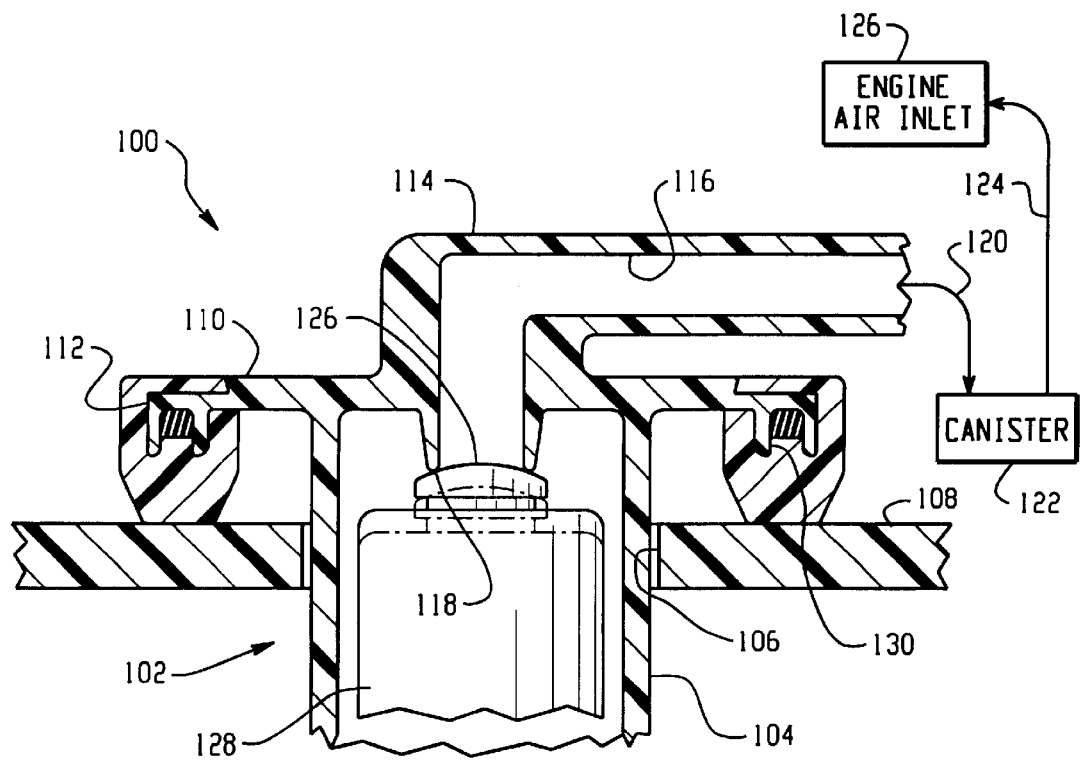
FIG. 2 is a cross section similar to FIG. 1 of another embodiment of the invention.
Figure 3:
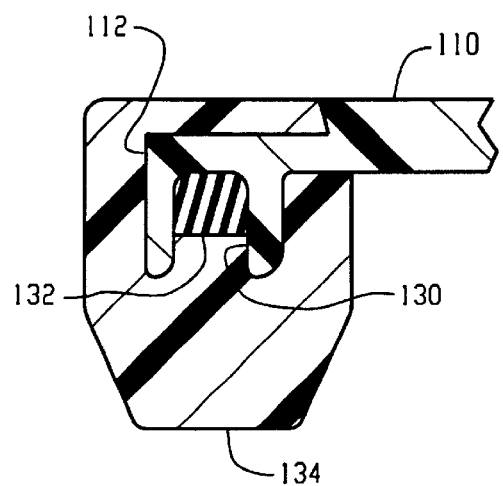
FIG. 3 is an enlarged view of a portion of FIG. 2.

Referring to FIGS. 2 and 3, another embodiment of the invention is indicated generally at 100 and has a valve body indicated generally at 102 having a hollow lower portion 104 extending through an access opening 106 in the top wall 108 of a fuel tank. The upper portion of the valve body 102, denoted by reference numeral 110, extends exteriorly of the access opening 106 and outwardly thereover in the form of an annular flange 112. The upper portion 110 of body 102 also has a fitting or nipple 114 formed thereon with a passage 116 therein which communicates with the interior of the lower portion 104 by means of a valve seat 118. The nipple 114 is adapted for connection to a conduit 120 which connects to a vapor storage canister 122 with the storage canister discharging through a conduit 124 to the engine air inlet indicated at 126.

The valve seat 118 is closed by a valve member or obtuator 126 which is attached to the upper end of a float 128 received in a hollow of the lower body portion 104 and which is responsive to the level of the liquid fuel (not shown) in the tank for closing against valve seat 118 when the tank is full. As fuel level within the tank drops, the valve abtuator 126 is lowered to the open position as indicated in dashed outline in FIG. 2. It will be understood that the operation of the float valve is similar to that of the embodiment of FIG. 1.

Referring to FIG. 3, the outer flange 112 of the upper body portion 110 has an annular groove 130 formed therein into which is received a suitable potting compound 132 which forms a seal therein. The potting compound 132 may be of room temperature curable material; and, after curing the outer portion of flange 112, the groove 130 and potting compound 132 are overmolded with suitable material to form an annular downwardly extending flange 134 alternatively, the annular groove may be radial in construction. In the presently preferred practice the over mold 134 comprises HDPE material; and, the potting compound comprises fluorocarbon elastomer potting compound. It will be understood however that the invention is not limited to these materials and other suitable materials may be employed. In the present practice of the invention the body 16, upper and lower portions and body 100 with its upper and lower portions is formed integrally as one piece by molding. In the present practice of the invention the body 16, 100 is formed of material being a member selected from the group consisting of aliphatic polyketone, polythalamine, polyamide, acetal, polyester, polyphenylene sulphide and glass filled polyamide.

The present invention thus provides a simple and low cost technique for sealing a formed of material attachment member weldable to a fuel tank to a valve body formed of material nonweldable to the fuel tank and preventing fuel vapor leakage through the attachment.

Although the invention has hereinabove been described with respect to the illustrated embodiments, it will be understood that the invention is capable of modification and variation and is limited only by the following claims.

What is claimed is:

1. A method of making a fuel vapor vent valve for mounting in an access opening in a veiled fuel tank comprising:

(a) forming a valve body having a lower portion for insertion through the access opening in the fuel tank and an upper portion extending exteriorly of the tank and forming a vapor port in the upper portion opening to the tank exterior and forming the valve body of fuel impervious material not weldable to the tank;

(b) forming an annular groove in the upper portion of the body and disposing a resilient sealing material in the annular groove;

(c) overmolding at least a part of the upper portion and the annular groove with material weldable to the fuel tank and sealing the overmolding with potting material.

2. The method defined in claim 1, wherein the step of forming an annular groove includes molding.

3. The method defined in claim 1, wherein the step of disposing a sealing material includes disposing fluorocarbon potting material.

4. The method defined in claim 1, wherein the step of overmolding includes overmolding with high-density polyethylene (HDPE) material.

5. The method defined in claim 1, wherein said step of forming a valve body includes forming the lower and upper portion integrally of a material being a member selected from the group consisting of aliphatic polyketone, polythalamine, polyamide, acetal polyester, polyphenylene sulphide and glass filled polyamide.

6. The method defined in claim 1, wherein the step of disposing a sealing material includes disposing a potting material.

7. The method defined in claim 6, wherein said step of disposing a potting material includes disposing a room temperature curing elastomer material.

8. The method defined in claim 1, wherein the step of disposing sealing material includes disposing an annular elastomeric about a rigid annular member and disposing the seal in said groove; and, the step of overmolding includes overmolding a portion of the rigid annular member.

9. The method defined in claim 8, wherein the step of disposing an elastomeric seal includes molding elastomer to a metal ring.

10. A vapor vent valve for installation in an access opening in a fuel tank:

(a) a valve body having a lower portion for insertion in the access opening and an upper portion for extending externally of the tank with a vapor port formed in the upper portion and communicating with the lower portion, the valve body being formed of material not weldable to the tank;

(b) a resilient annular seal disposed on the upper portion of the body; and, (c) an overmold formed of material weldable to the tank disposed about the annular seal.

11. The assembly defined in claim 10, wherein the body upper and lower portions are formed integrally of molded material.

12. The assembly defined in claim 11, wherein the overmold is formed of high-density polyethylene (HDPE) material.

13. The assembly defined in claim 11, wherein the valve body is formed of a material being a member selected from the group consisting of aliphatic polyketone, polythalamine, polyamide, acetal, polyester, polyphenylene sulphide and glass filled polyamide.

14. The assembly defined in claim 10, wherein the annular seal is formed of elastomer and is retained by a rigid ring with the annular overmold extending over at least a portion of the rigid ring.

15. The assembly defined in claim 10, wherein the annular seal is formed of potting material.

16. The assembly defined in claim 15, wherein the annular seal is formed of fluorocarbon potting material.

* * * * *